No. 725,125. PATENTED APR. 14, 1903.
E. PARENT.
IMPLEMENT FOR DRIVING NAILS OR TACKS.
APPLICATION FILED JUNE 20, 1901.
NO MODEL. 2 SHEETS—SHEET 1.
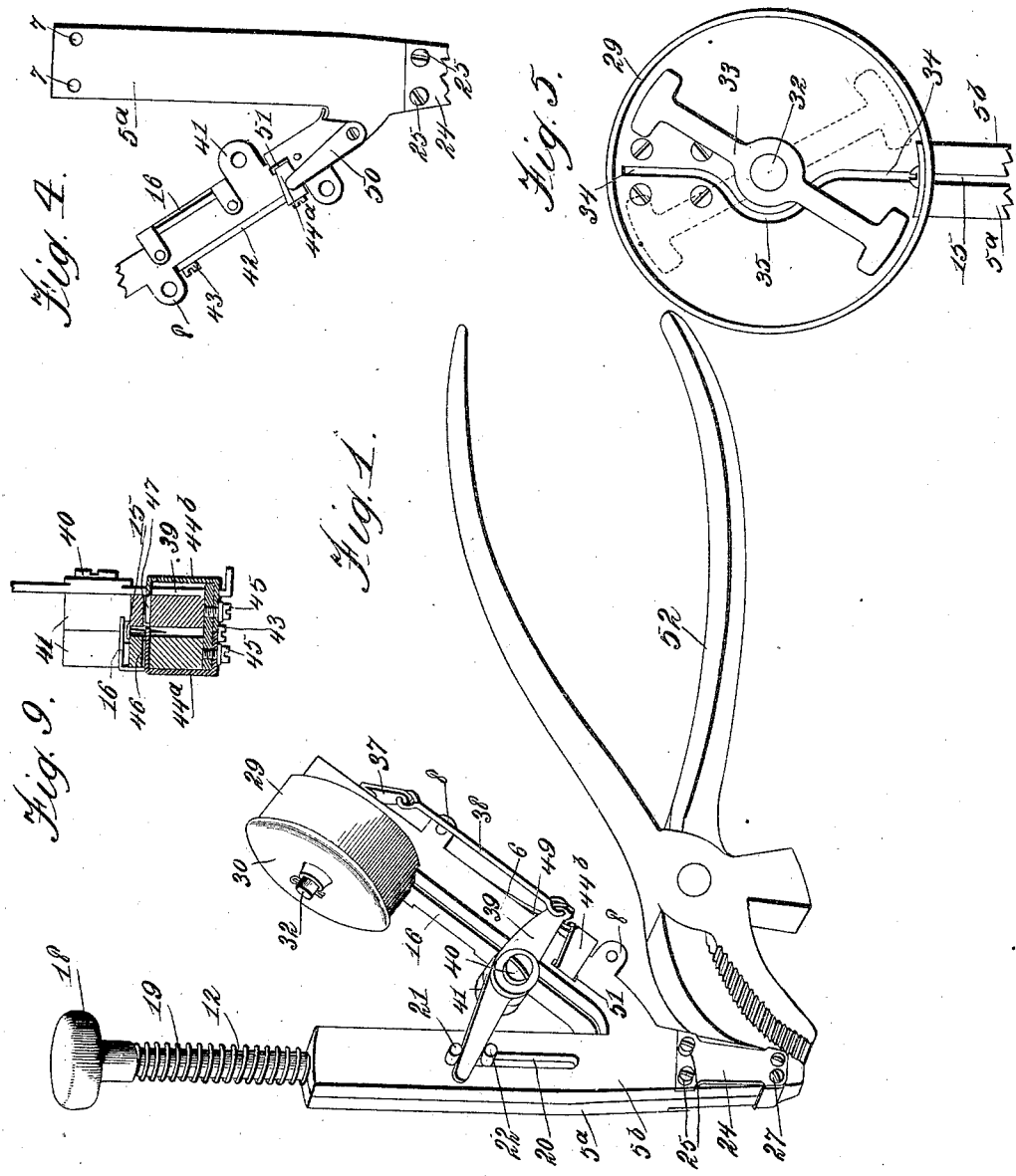
Witnesses:
J. F. Groat.
H. F. Bernhard
Edmond Parent, Inventor
By Marion & Marion
Attorneys

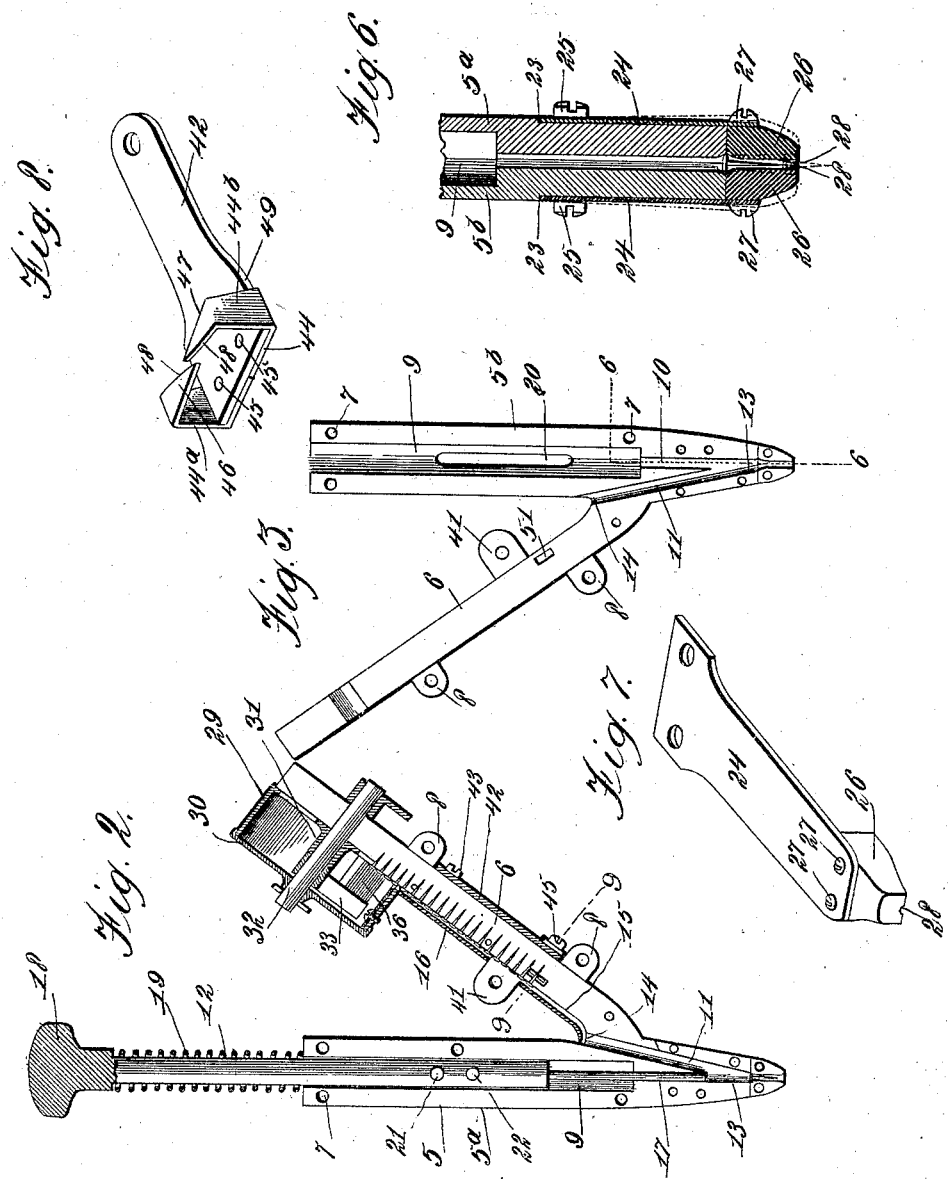

UNITED STATES PATENT OFFICE.

EDMOND PARENT, OF MONTREAL, CANADA, ASSIGNOR TO BLANCHE PARENT, OF MONTREAL, CANADA.

IMPLEMENT FOR DRIVING NAILS OR TACKS.

SPECIFICATION forming part of Letters Patent No. 725,125, dated April 14, 1903.

Application filed June 20, 1901. Serial No. 65,295. (No model.)

*To all whom it may concern:*

Be it known that I, EDMOND PARENT, a subject of the King of Great Britain, residing in the city and district of Montreal, Province of Quebec, Canada, have invented certain new and useful Improvements in Implements for Driving Nails or Tacks; and I do hereby declare that the following is a full, clear, and exact description of the invention, such as will enable others skilled in the art to which it appertains to make and use the same.

My invention relates to improvements in implements for driving nails and tacks; and among other things the invention has for its object the provision of a simple, compact, and light instrument which is capable of being easily handled and manipulated, so as to rapidly and accurately drive nails or tacks, to provide means for automatically feeding the nails or tacks one after the other in the path of the driving-plunger, to prevent the nails or tacks from crowding too rapidly in the runway, to agitate the contents of the magazine, and thus insure the feed of the nails or tacks to the runway, and to yieldably and momentarily retain the nail or tack in position for driving by the plunger.

The invention consists in the novel construction and arrangement of parts which will be hereinafter fully described and claimed.

In the accompanying drawings, forming a part of this specification, Figure 1 is a perspective view illustrating my driving implement in connection with a shoemaker's nippers to enable the complete device to be used as a hand lasting-tool. Fig. 2 is a vertical section taken centrally through the driving implement and showing it entirely disconnected from the nippers. Fig. 3 is a detail face view of one of the complemental members of the frame. Fig. 4 is a detail view in elevation showing the reverse side from Fig. 1. Fig. 5 is a detail view of the magazine. Fig. 6 is an enlarged fragmentary section on the line 6 6 of Fig. 3. Fig. 7 is a detail perspective of a carrier-spring and a jaw. Fig. 8 is a detail perspective of the detent or check device adapted to control the feed of the nails or tacks. Fig. 9 is a cross-section in the plane of the dotted line 9 9 on Fig. 2.

The same numerals of reference denote like parts in each of the several figures of the drawings.

The frame 5 of the improved implement is provided with an offstanding arm 6, which is arranged at an angle to the frame, as shown by Figs. 1 to 3, and this frame and its arm are bisected or divided longitudinally, so as to facilitate the manufacture and assemblage of the parts comprising the implement, whereby the frame may be said to consist of the members $5^a$ $5^b$. These members and the parts forming the frame 6 are disposed in overlapping relation and are clamped laterally and solidly together by means of suitable screws adapted to pass through the screw-holes 7 and the lugs 8.

The members comprising the frame 5 are provided in their opposing inner faces with the plunger-passage 9, with the straight grooves 10, and with the inclined grooves 11, the passages and the grooves in the two members being in coincident relation or registration, so as to provide for the accommodation of the plunger 12 in the passage 9 and to make the grooves form or produce the straight and inclined channels, the same being indicated more clearly in Figs. 2 and 3. The lower ends of the straight channel and of the inclined channel meet above the lower extremity of the frame, so as to form the throat 13, and the straight channel 10 has direct communication with the plunger-passage 9, while the inclined channel 11 opens through the top edge of the frame at the angle formed by the juncture of the inclined arm therewith, so as to produce a mouth 14. The top edge of the inclined arm 6 is provided with a longitudinal groove adapted to form an inclined runway 15, the same being covered by a cap-plate 16, that is secured to the arm, the lower portion of this runway 15 being in communication with the mouth 14 of the inclined channel 11, whereby the tacks or nails are adapted to pass from the runway into the channel 11 and thence into the throat 13. The plunger 12 is provided on its lower extremity with a reduced stem 17 and at its upper end with a head 18, said plunger being arranged to play freely in the passage 9, while its stem is adapted to the vertical channel 10. The plunger is maintained normally in a raised position by the energy of a spring 19, that is seated upon the frame 5 and bears against the head 18, the upper movement of the plunger being limited by suitable stop devices, so that normally the plunger and the stem will occupy the position shown by Fig. 2, wherein the lower end of the plunger-stem 17 will lie in the vertical channel 10 at a point just clear of the inclined channel 11, thus permitting a nail or tack to pass into the throat 13 and below the extremity of the plunger-stem. The frame member $5^b$ is provided with a vertical longitudinal slot 20, in which are adapted to play the studs 21 22, the same serving to prevent the plunger from turning on its axis within the frame, and the former arranged to limit the upward movement of the plunger, while the latter is disposed to limit the lower movement of the plunger.

The opposite sides of the members forming the frame 5 are recessed, as indicated at 23 in Fig. 6, and in these recesses are fitted the carrier-springs 24, the same being firmly secured at their upper ends by the screws 25 to the frame. These carrier-springs support the coacting jaws 26 26, which are preferably fastened to said springs by the screws 27. These jaws extend inwardly with respect to the springs 24, so as to lie below and in line with the foot of the frame 5, and said jaws are provided in their opposing faces with the grooves 28, the same being in the registering relation represented by Fig. 6, so as to form a passage which is in line with the throat 13 and which communicates directly therewith, thereby providing means adapted to yieldably and momentarily retain the nail or tack in a position in the path of the driving-plunger.

29 designates a magazine which is secured removably to the upper outer extremity of the inclined arm 6, forming a part of the frame, said magazine having a cover 30 secured removably thereto. Projecting from the bottom of the magazine is a shaft-bearing 31, in which is journaled a rock-shaft 32, that extends through the cover and also extends through the arm 6 of the frame. (See Fig. 2.) Said rock-shaft thus extends through the magazine in a position to receive the head 33 of a vibratory agitator, the same being made fast with the shaft and arranged to extend transversely across the magazine. In the bottom of this magazine is formed a slot 34, which is bent or deflected, as at 35 in Fig. 5, and this slot has communication with the chamber of the magazine, so that nails or tacks contained in the same will be free to drop into the slot 34 or its deflected portion 35, whereby the nails or tacks may easily enter the slot, while the heads thereof are prevented from passing into the same. The slot 34 of the magazine has direct communication with the runway 15, so that the nails or tacks may pass from the magazine through the runway 15, the inclined channel 11, and the throat 13 to the yieldable jaws 26. The agitator-head is secured to the rock-shaft in a position to make it travel back and forth across the feed-slot 34, and this head is provided at its end portions with the brushes 36, that are arranged to frictionally sweep across the slot 34 in the magazine. A crank-arm 37 is fastened to the end of the rock-shaft 32, that projects below the frame-arm 6, and to this crank-arm is connected one end of a link 38, the same extending alongside of the frame-arm, as shown by Fig. 1, and having its other end loosely connected to an inclined lever 39. Said lever is fulcrumed at a point intermediate of its length by means of a bolt 40, which is supported in lugs 41 on the parts comprising the arm 6 of the frame, and the otherwise free end of this lever is loosely fitted between the studs or pins 21 22 of the plunger, whereby the lever is rocked or vibrated on each movement of the plunger, such rocking motion being communicated through the link and the crank-arm to the shaft and the head of the agitator, thus making the brushes sweep the slotted bottom of the magazine and agitating the contents thereof.

42 designates a rocking plate, which is applied to the lower side of the frame-arm 6 and is pivotally connected thereto by the screw 43. A clasp-shaped controller 44 is carried by the free end of this pivoted plate 42, said controller consisting of two members $44^a$ $44^b$, which are fastened separately by the screws 45 to the plate and are arranged to clasp the sides of the arm 6 of the frame. Said members terminate in the fingers 46 47, which are beveled, as indicated at 48 in Fig. 8, in order to make the active ends of said fingers overlap one another and for the finger 47 to lie above the finger 46. The plate 42, which carries the controller, has a cam-shaped edge or face 49, and against the opposite edge of this pivoted plate 42 is arranged to bear the pressure-spring 50, (see Fig. 4,) said spring being attached to the frame-arm 6 and having its free end engaging with one of the controller members $44^a$. The energy of the spring 50 is thus exerted on the plate or controller in order to force the cam-shaped face 49 into the path of the lever 39, as shown by Fig. 1. From this description it will be seen that the plate 42 is pressed in one direction by a spring 50 and that the lever 39 when it is actuated by the plunger is arranged to ride against the cam-shaped face 49 for the purpose of positively moving the plate 42 and the controller 44 against the energy of the spring. The fingers 46 47 of the controller are arranged to extend into a slot 51, which is provided in the arm and which extends across said arm in a manner to intercept with the runway 15, and in the normal position of the plate 42 and the controller the finger 46 lies in a position for the lowermost tack or nail of the series to rest against the same, as indicated by Fig. 2. Now when the plunger descends and the lever 39 is actuated so as to move the agitator automatically said lever rides against the face 49 of the plate and moves the controller so as to simultaneously retract the finger 46 and advance the finger 47, thereby releasing the nail or tack which was in engagement with the finger 46 and projecting the finger 47 across the runway, so as to prevent more than one tack or nail from passing into the throat 13 at each operation of the plunger. When the plunger is again lifted and the lever 39 is moved to its normal position, wherein it is free from the face 49, the spring returns the pivoted plate 42 and the controller to their normal positions, thus retracting the finger 47 and moving the finger 46 across the runway, so as to receive the next nail or tack in the series.

In Fig. 1 I have shown the driving implement operatively combined with a pair of shoemaker's nippers, (indicated in their entirety by the numeral 52.) The framework is arranged for the lower portion thereof to be attached to or made as a part of the jaw of one of the handles, thus converting the device into a hand lasting-tool; but it is evident that the nail-driver may be entirely disassociated from the nippers, so that it may be used generally as a nailing or tacking device, in which case the implement may be equipped with a suitable handle for its manipulation.

The device may be made in different sizes, according to the sizes of the nails or tacks which are to be driven thereby; but of course this is a mechanical expedient falling within the skill of the constructor.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described my invention, what I claim as new is—

1. An implement of the class described comprising a framework provided with an inclined arm having a runway, a magazine supported by said arm, a vibratory plate pivoted to the arm and held in one position thereon by a spring, a controller supported by the plate and having fingers spaced relatively to one another and arranged to intercept the runway, a rocking agitator arranged within the magazine and provided with an external arm, a plunger, a lever pivoted on said inclined arm and having operative connection at one end with the plunger and arranged for its other end to positively move the pivoted plate against the energy of its spring, and a link connecting said lever to the arm of the agitator, substantially as described.

2. A nail or tack driving implement of the class described comprising a frame consisting of the complemental members having the inclined arm, the opposing faces of said members having the vertical and inclined channels meeting in a throat, and said inclined arm having a runway which is covered by a cap-plate, a plunger provided with a stem and arranged in the frame for said stem to traverse the vertical channel and throat, a plate pivoted on the arm, a controller attached to the plate and having fingers arranged to extend across the runway, a magazine supported on the arm, an agitator within said magazine, a lever connected with the plunger and mounted on the arm in a position to engage with the pivoted plate, and operative connections between the lever and said agitator, substantially as described.

In witness whereof I have hereunto set my hand in the presence of two witnesses.

EDMOND PARENT.

Witnesses:
J. A. MARION,
T. MYNARD.